US011232605B2

(12) United States Patent
Sakai (10) Patent No.: US 11,232,605 B2
(45) Date of Patent: Jan. 25, 2022

(54) METHOD FOR GENERATING IMAGE DATA, PROGRAM, AND INFORMATION PROCESSING DEVICE

(71) Applicant: SEIKO EPSON CORPORATION, Tokyo (JP)

(72) Inventor: Toshiyuki Sakai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/104,111

(22) Filed: Nov. 25, 2020

(65) Prior Publication Data
US 2021/0158578 A1    May 27, 2021

(30) Foreign Application Priority Data

Nov. 26, 2019 (JP) .............................. JP2019-212928

(51) Int. Cl.
*G06T 11/00* (2006.01)
*G06F 3/14* (2006.01)
(52) U.S. Cl.
CPC ................ *G06T 11/00* (2013.01); *G06F 3/14* (2013.01)
(58) Field of Classification Search
CPC .................................... G06T 11/00; G06F 3/14
See application file for complete search history.

(56) References Cited

U.S. PATENT DOCUMENTS

| 5,963,204 A | 10/1999 | Ikeda et al. |
| 6,286,873 B1 * | 9/2001 | Seder ...................... G09F 19/14 283/117 |
| 10,379,719 B2 * | 8/2019 | Scapel .................... H04L 51/10 |
| 2019/0349625 A1 * | 11/2019 | Watanabe ............. G06T 19/006 |

FOREIGN PATENT DOCUMENTS

| JP | H10-108123 A | 4/1998 |
| JP | 2004-248076 A | 9/2004 |
| JP | 2007-068062 A | 3/2007 |
| JP | 2010-092402 A | 4/2010 |
| JP | 2019-197292 A | 11/2019 |

* cited by examiner

*Primary Examiner* — Samantha (Yuehan) Wang
(74) *Attorney, Agent, or Firm* — Oliff PLC

(57) ABSTRACT

A method for generating image data includes: displaying a first object corresponding to a first video image on a display surface; and generating first image data representing a first superimposed video image in which the first video image is superimposed on a first area of a predetermined image, based on a first operation on the first object. The first video image has a time length that is a predetermined time divided by m, m being an integer equal to or greater than 1. The first superimposed video image has a time length that is the predetermined time. The first superimposed video image is a video image in which display of the first video image is executed the m times in a state where the first video image is superimposed on the first area of the predetermined image.

4 Claims, 5 Drawing Sheets

METHOD FOR GENERATING IMAGE DATA, PROGRAM, AND INFORMATION PROCESSING DEVICE

The present application is based on, and claims priority from JP Application Serial Number 2019-212928, filed Nov. 26, 2019, the disclosure of which is hereby incorporated by reference herein in its entirety.

BACKGROUND

1. Technical Field

The present disclosure relates to a method for generating image data, a program, and an information processing device.

2. Related Art

JP-A-2010-92402 describes an animation preparation device generating image data of a video image. On receiving an instruction from a user about a movement to be executed by a character, the animation preparation device described in JP-A-2010-92402 generates image data of a video image showing the character executing the movement.

When generating image data of a video image using the animation preparation device described in JP-A-2010-92402, the user needs to input an instruction about every movement to be executed by an object such as a character. This process takes time and effort.

SUMMARY

A method for generating image data according to an aspect of the present disclosure includes: displaying a first object corresponding to a first video image on a display surface; and generating first image data representing a first superimposed video image in which the first video image is superimposed on a first area of a predetermined image, based on a first operation on the first object. The first video image has a time length that is a predetermined time divided by m, m being an integer equal to or greater than 1. The first superimposed video image has a time length that is the predetermined time. The first superimposed video image is a video image in which display of the first video image is executed the m times in a state where the first video image is superimposed on the first area of the predetermined image.

A method for generating image data according to another aspect of the present disclosure includes: displaying an object corresponding to a predetermined video image on a display surface; generating image data representing a superimposed video image in which the predetermined video image is superimposed on a first area of a predetermined image, based on an operation on the object; and when a first time that is set as a time length of the superimposed video image is different from a second time that is set as a time length of the predetermined video image, changing the time length of the predetermined video image included in the superimposed video image to a third time that is different from the second time.

An information processing device according to another aspect of the present disclosure includes: a display control unit causing a first object corresponding to a first video image to be displayed on a display surface; and a generation unit generating first image data representing a first superimposed video image in which the first video image is superimposed on a first area of a predetermined image, based on a first operation on the first object. The first video image has a time length that is a predetermined time divided by m, m being an integer equal to or greater than 1. The first superimposed video image has a time length that is the predetermined time. The first superimposed video image is a video image in which display of the first video image is executed the m times in a state where the first video image is superimposed on the first area of the predetermined image.

DESCRIPTION OF EXEMPLARY EMBODIMENTS

A. First Embodiment

A1. Outline of Information Processing Device 100

Figure 1:
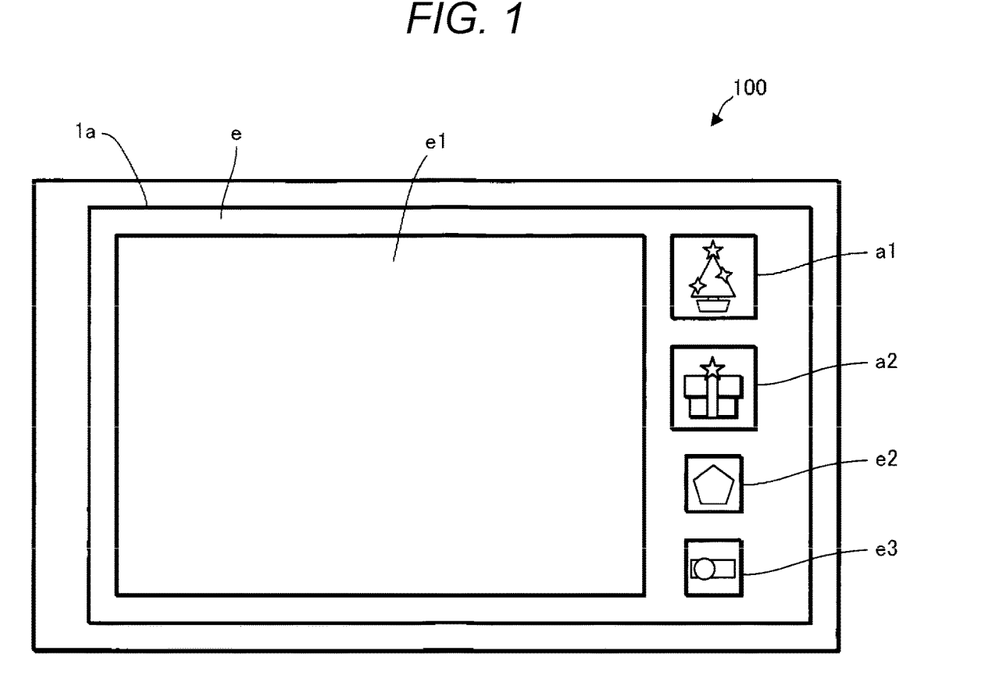
FIG. 1 shows an information processing device 100 according to a first embodiment.

FIG. 1 shows an information processing device 100 according to a first embodiment. In FIG. 1, a smartphone is shown as an example of the information processing device 100. The information processing device 100 is not limited to a smartphone. The information processing device 100 may be, for example, a PC (personal computer) or tablet terminal.

The information processing device 100 includes a display surface 1a displaying various images. The display surface 1a shown in FIG. 1 displays an operation screen e. The information processing device 100 generates image data representing a video image, based on an operation on the display surface 1a. A time length of the video image is set to 15.0 seconds. 15.0 seconds is an example of a predetermined time. The predetermined time is not limited to 15.0 seconds. The predetermined time may be longer than 0 seconds and shorter than 15.0 seconds. The predetermined time may be longer than 15.0 seconds.

The video image represented by the image data is repeatedly displayed, for example, by a display device such as a projector. When the first image of the video image represented by the image data coincides with the last image of the video image, a person viewing the video image is highly likely to recognize the video image that is repeatedly played, as a seamless video image. Such a video image is used, for example, for a product advertisement or for a light effect to create a certain impression of a product.

A2. Example of Information Processing Device 100

Figure 2:
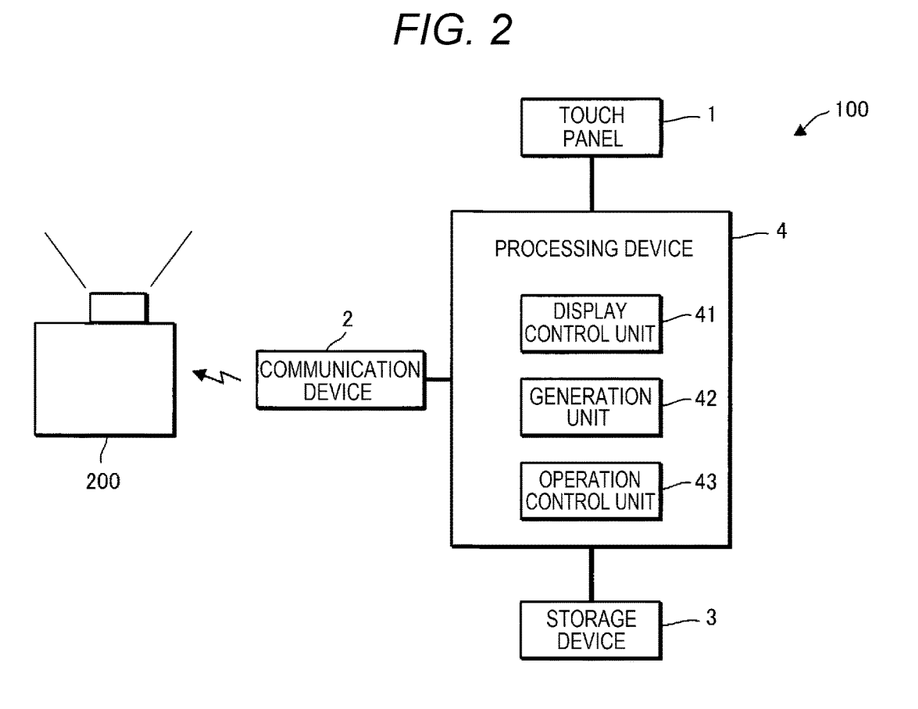
FIG. 2 shows an example of the information processing device 100.

FIG. 2 shows an example of the information processing device 100. The information processing device 100 includes a touch panel 1, a communication device 2, a storage device 3, and a processing device 4.

The touch panel 1 is a device in which a display device displaying an image and an input device accepting an operation by a user are integrated together. The touch panel 1 includes the display surface 1*a*. The touch panel 1 displays various images on the display surface 1*a*. The touch panel 1 detects a touch position, using an electrostatic capacitance specified by an object in contact with the touch panel 1 and the touch panel 1.

The communication device 2 communicates with various devices. The communication device 2 communicates, for example, with a projector 200 via a wireless LAN (local area network). The communication device 2 may communicate with a device such as the projector 200 via a different communication form from wireless LAN. The different communication form from wireless LAN is, for example, wired communication or Bluetooth. Bluetooth is a registered trademark.

The projector 200 is an example of a display device. The display device is not limited to a projector and may be a display, for example, an FPD (flat panel display). The FPD is, for example, a liquid crystal display, plasma display, or organic EL (electroluminescence) display.

The storage device 3 is a recording medium readable to the processing device 4. The storage device 3 includes, for example, a non-volatile memory and a volatile memory. The non-volatile memory is, for example, a ROM (read-only memory), EPROM (erasable programmable read-only memory), or EEPROM (electrically erasable programmable read-only memory). The volatile memory is, for example, a RAM.

The storage device 3 stores a program executed by the processing device 4 and various data used by the processing device 4. The program can also be referred to as an "application program", "application software", or "app". The program is acquired, for example, from a server or the like, not illustrated, via the communication device 2 and is subsequently stored in the storage device 3. The program may be stored in the storage device 3 in advance.

The processing device 4 is formed of, for example, a single processor or a plurality of processors. In an example, the processing device 4 is formed of a single CPU (central processing unit) or a plurality of CPUs. A part or all of the functions of the processing device 4 may be implemented by a circuit such as a DSP (digital signal processor), ASIC (application-specific integrated circuit), PLD (programmable logic device), or FPGA (field-programmable gate array). The processing device 4 executes various kinds of processing in parallel or in sequence. The processing device 4 reads the program from the storage device 3. The processing device 4 executes the program read from the storage device 3 and thus implements a display control unit 41, a generation unit 42, and an operation control unit 43.

The display control unit 41 controls the touch panel 1 and thus controls the display on the display surface 1*a*. The display control unit 41 causes a first object a1 and a second object a2 to be displayed on the display surface 1*a*, as shown in FIG. 1.

Figure 3:
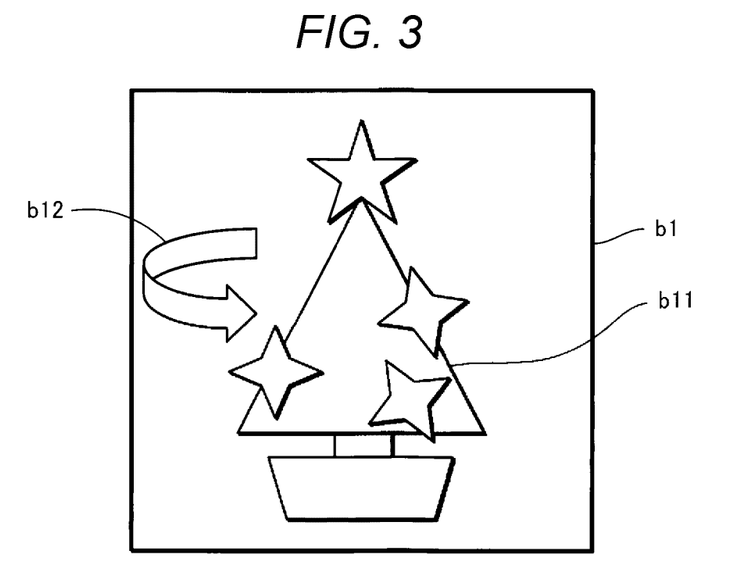
FIG. 3 explains an example of a first video image b1.

The first object a1 is made to correspond to a first video image b1 as illustrated in FIG. 3. The first video image b1 can be a component of a video image represented by image data generated by the information processing device 100. The first video image b1 can also be referred to as a first component candidate.

The first video image b1 shows a movement of an object. The first video image b1 illustrated in FIG. 3 is a video image in which a Christmas tree b11 makes one rotation in the direction of a first arrow b12. The first image of the first video image b1 illustrated in FIG. 3 coincides with the last image of the first video image b1 illustrated in FIG. 3.

Figure 4:
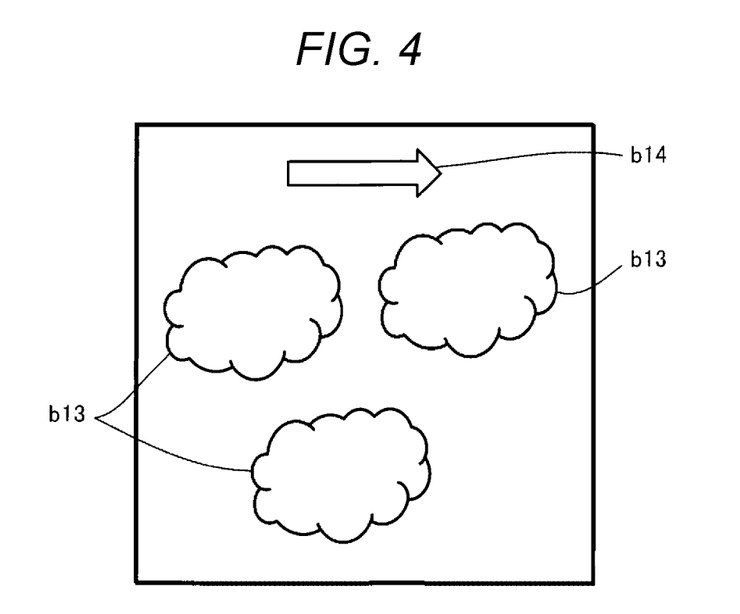
FIG. 4 explains another example of the first video image b1.

The first video image b1 is not limited to the video image as illustrated in FIG. 3. For example, the first video image b1 may be a video image in which a cloud b13 moves in the direction of a second arrow b14, thus disappears from the video image, subsequently reappears from the left end of the video image, then moves in the direction of the second arrow b14, and ultimately turns into the same state as the initial state, as illustrated in FIG. 4. The first image of the first video image b1 illustrated in FIG. 4 coincides with the last image of the first video image b1 illustrated in FIG. 4.

When the first image of the first video image b1 coincides with the last image of the first video image b1, the video image presented by repeatedly displaying the first video image b1 can be recognized as a seamless video image. However, the first image of the first video image b1 may not coincide with the last image of the first video image b1.

A time length of the first video image b1 is 15.0 seconds, that is, the time length of the video image represented by the image data generated by the information processing device 100, divided by m, m being an integer equal to or greater than 1. The time length of the first video image b1 is, for example, 15.0 seconds, 7.5 seconds, or 5.0 seconds. The first object a1 is not limited to the configuration illustrated in FIG. 1 and may be, for example, the first image of the first video image b1 or a letter representing the first video image b1.

Figure 5:
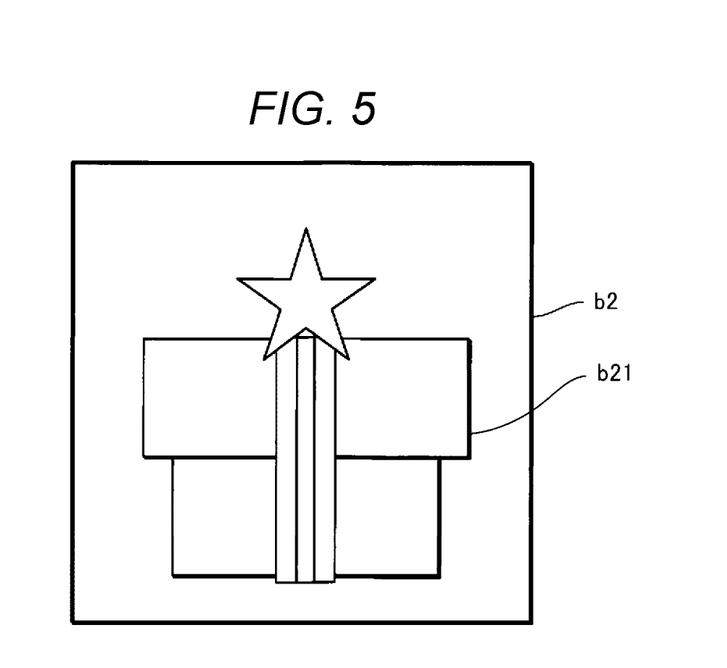
FIG. 5 explains an example of a second video image b2.

The second object a2 is made to correspond to a second video image b2 as illustrated in FIG. 5. Just like the first video image b1, the second video image b2 can be a component of a video image represented by image data generated by the information processing device 100. The second video image b2 can also be referred to as a second component candidate.

The second video image b2 is a different video image from the first video image b1. The second video image b2 illustrated in FIG. 5 is a video image in which a present box b21 shifts from a stationary state into a vibrating state and subsequently shifts back into the stationary state. The first image of the second video image b2 illustrated in FIG. 5 coincides with the last image of the second video image b2 illustrated in FIG. 5. The second video image b2 is not limited to the video image of the present box b21 as illustrated in FIG. 5 and can be suitably changed.

When the first image of the second video image b2 coincides with the last image of the second video image b2, the video image presented by repeatedly displaying the second video image b2 can be recognized as a seamless video image. However, the first image of the second video image b2 may not coincide with the last image of the second video image b2.

A time length of the second video image b2 is 15.0 seconds, that is, the time length of the video image represented by the image data generated by the information processing device 100, divided by n, n being an integer equal to or greater than 1. The time length of the second video image b2 is, for example, 15.0 seconds, 7.5 seconds, or 5.0 seconds. The second object a2 is not limited to the configuration illustrated in FIG. 1 and may be, for example, the first image of the second video image b2 or a letter representing the second video image b2.

Figure 6:
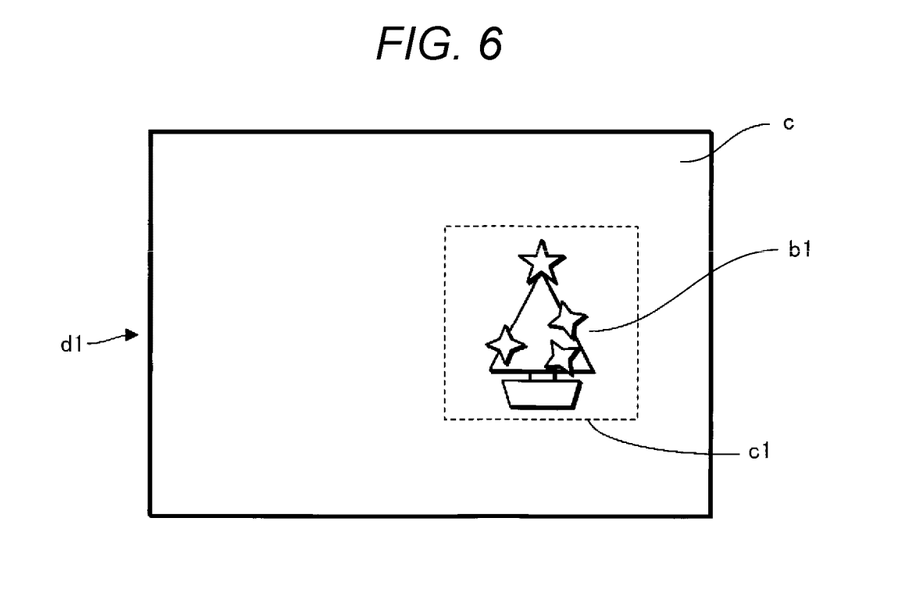
FIG. 6 explains an example of a first superimposed video image d1.

The generation unit 42 generates image data representing a video image, based on an operation on the touch panel 1. For example, the generation unit 42 generates first image data representing a first superimposed video image d1 as illustrated in FIG. 6, based on a first operation on the first object a1, for example, a touch operation on the first object a1 by the user. In the first superimposed video image d1 illustrated in FIG. 6, the first video image b1 is superimposed on a first area c1 of a background image c.

The background image c is a single-color image, for example, a black image. The single-color image is not limited to the black image. For example, the single-color image may be a white image or blue image. The background image c is not limited to the single-color image. For example, the background image c may be an image having a plurality of colors. The background image c may be a still image or video image. The background image c may be preset or may be set by the user. The background image c is an example of a predetermined image.

The first image data is an example of the image data generated by the information processing device 100. The first superimposed video image d1 is an example of the video image represented by the image data generated by the information processing device 100. A time length of the first superimposed video image d1 is 15.0 seconds.

The first superimposed video image d1 is a video image in which the display of the first video image b1 is executed m times in the state where the first video image b1 is superimposed on the first area c1 of the background image c. Therefore, in the first superimposed video image d1, the first video image b1 can be recognized as a seamless video image. Also, the video image presented by repeatedly displaying the first superimposed video image d1 can be recognized as a seamless video image.

The first area c1 is a partial area of the background image c. The first area c1 may be the entire area of the background image c. The first area c1 may be preset or may be set by the user.

Figure 7:
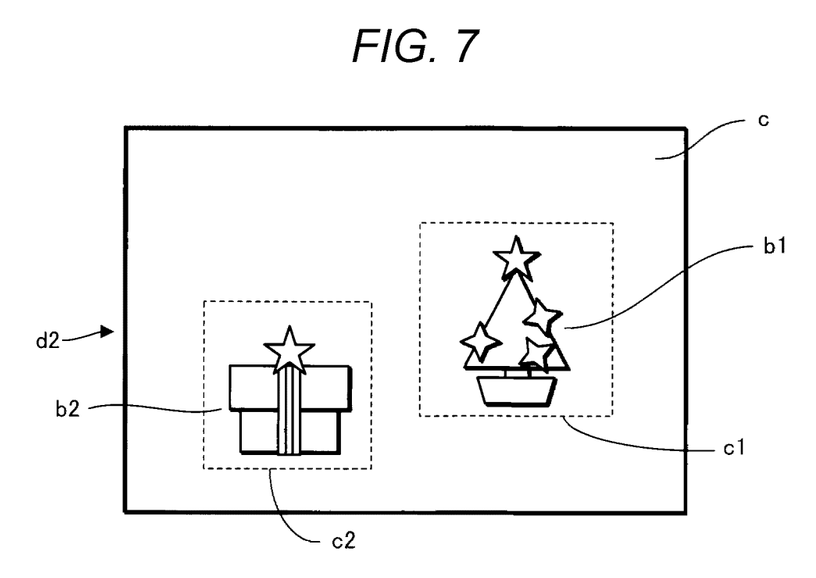
FIG. 7 explains an example of a second superimposed video image d2.

The generation unit 42 generates second image data representing a second superimposed video image d2 as illustrated in FIG. 7, based on the first operation on the first object a1 and a second operation on the second object a2. In the second superimposed video image d2 illustrated in FIG. 7, the first video image b1 is superimposed on the first area c1 of the background image c and the second video image b2 is superimposed on a second area c2 of the background image c.

The second image data is another example of the image data generated by the information processing device 100. The second superimposed video image d2 is another example of the video image represented by the image data generated by the information processing device 100. A time length of the second superimposed video image d2 is 15.0 seconds.

The second superimposed video image d2 is a video image in which the display of the first video image b1 is executed m times and the display of the second video image b2 is executed n times in the state where the first video image b1 is superimposed on the first area c1 of the background image c and the second video image b2 is superimposed on the second area c2 of the background image c. Therefore, in the second superimposed video image d2, the first video image b1 can be recognized as a seamless video image. Also, in the second superimposed video image d2, the second video image b2 can be recognized as a seamless video image. Moreover, the video image presented by repeatedly displaying the second superimposed video image d2 can be recognized as a seamless video image.

The second area c2 is a partial area of the background image c. The second area c2 may be the entire area of the background image c. The second area c2 may be preset or may be set by the user. At least a part of the second area c2 may overlap at least a part of the first area c1.

The operation control unit 43 controls various operations. For example, the operation control unit 43 transmits the first image data from the communication device 2 to the projector 200. The operation control unit 43 also transmits the second image data from the communication device 2 to the projector 200.

A3. Description of Operations

Figure 8:
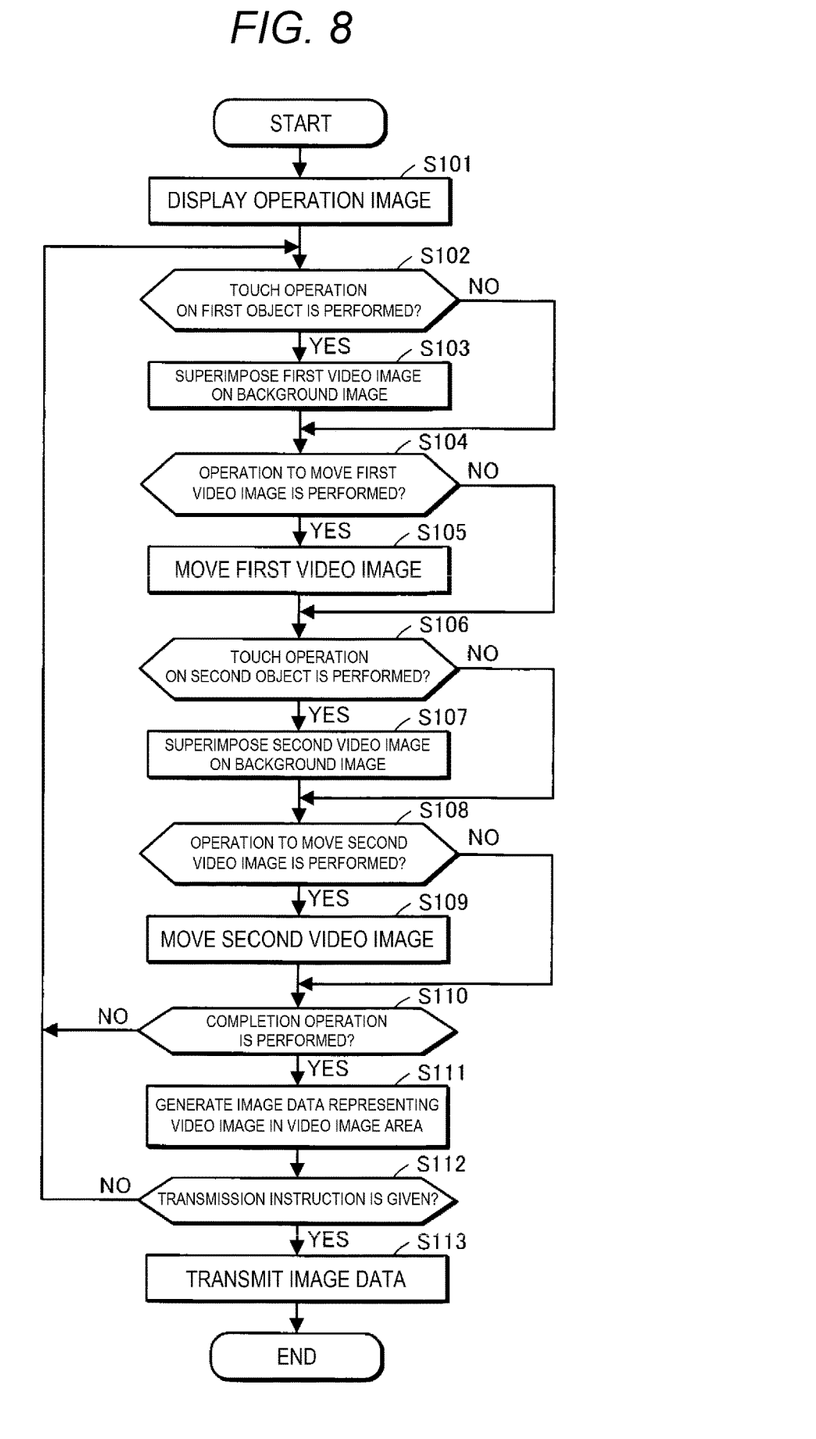
FIG. 8 is a flowchart for explaining operations of the information processing device 100.

FIG. 8 is a flowchart for explaining operations of the information processing device 100. In the description below, it is assumed that a specific icon corresponding to the program stored in the storage device 3 is displayed on the display surface 1a.

When the user touches the specific icon displayed on the display surface 1a with a finger, the touch panel 1 outputs touch position information representing the touch position of the finger to the processing device 4. When the touch position represented by the touch position information is the position of the specific icon, the processing device 4 reads the program corresponding to the specific icon from the storage device 3. Subsequently, the processing device 4 executes the program read from the storage device 3 and thus implements the display control unit 41, the generation unit 42, and the operation control unit 43.

Next, in step S101, the display control unit 41 provides initial operation image data representing the operation screen e shown in FIG. 1 to the touch panel 1 and thus causes the operation screen e to be displayed on the display surface 1a.

The operation screen e shown in FIG. 1 includes a video image area e1, the first object a1, the second object a2, a complete button e2, and a send button e3. The video image area e1 is used to generate a video image. In the video image area e1, the background image c is displayed. The complete button e2 is a button for giving an instruction to complete the generation of a video image using the video image area e1. The send button e3 is a button for giving an instruction to transmit image data representing a video image generated in the video image area e1.

Subsequently, when the user touches the first object a1 with a finger, the touch panel 1 outputs touch position information representing the touch position of the finger to the processing device 4. The touch on the first object a1 with a finger is an example of the first operation on the first object a1. When the touch position represented by the touch position information is the position of the first object a1, the generation unit 42 in step S102 determines that a touch operation on the first object a1 is performed.

When it is determined that a touch operation on the first object a1 is performed, the generation unit 42 in step S103 superimposes the first video image b1 on the first area c1 as illustrated in FIG. 6. Therefore, the first video image b1 is displayed over the background image c.

Specifically, the generation unit 42 first generates first operation image data representing a video image in which the first video image b1 is superimposed on the first area c1, on the operation screen e. Subsequently, the generation unit 42 outputs the first operation image data to the touch panel 1 and thus causes the video image represented by the first operation image data to be displayed on the display surface 1a.

The position of the first area c1 in the background image c is not limited to the position shown in FIG. 6. For example, the position of the first area c1 in the background image c may be set in such a way that the centroid position of the first area c1 coincides with the centroid position of the background image c.

Next, when the user touches the first video image b1 with a finger and subsequently moves the finger in contact with the touch panel 1, the touch panel 1 outputs touch position information representing the trajectory of the touch position of the finger to the processing device 4. When the start position of the trajectory represented by the touch position information is the position where the first video image b1 is present, the display control unit 41 in step S104 determines that an operation to move the first video image b1 is performed.

When it is determined that an operation to move the first video image b1 is performed, the display control unit 41 in step S105 moves the position of the first video image b1, that is, the position of the first area c1 where the first video image b1 is displayed, according to the trajectory represented by the touch position information.

The display control unit 41 may change the size of the first video image b1, that is, the size of the first area c1, according to an operation on the first video image b1. The display control unit 41 may also change the direction of the first video image b1, that is, the direction of the first area c1, according to an operation on the first video image b1.

Next, when the user touches the second object a2 with a finger, the touch panel 1 outputs touch position information representing the touch position of the finger to the processing device 4. When the touch position represented by the touch position information is the position of the second object a2, the generation unit 42 in step S106 determines that a touch operation on the second object a2 is performed.

When it is determined that a touch operation on the second object a2 is performed, the generation unit 42 in step S107 superimposes the second video image b2 on the second area c2. Therefore, the second video image b2 is displayed over the background image c.

When it is determined that a touch operation on the second object a2 is performed after a touch operation on the first object a1, the generation unit 42 in step S107 superimposes the second video image b2 on the second area c2 in the background image c where the first video image b1 is already located, as illustrated in FIG. 7.

Specifically, the generation unit 42 first generates second operation image data representing a video image in which the first video image b1 is superimposed on the first area c1 and the second video image b2 is superimposed on the second area c2, on the operation screen e. Next, the generation unit 42 outputs the second operation image data to the touch panel 1 and thus causes the video image in which the first video image b1 is superimposed on the first area c1 and the second video image b2 is superimposed on the second area c2, to be displayed on the display surface 1a.

The generation unit 42 may or may not make the start timing of the first video image b1 located in the first area c1 and the start timing of the second video image b2 located in the second area c2 coincide with each other.

When the start timing of the first video image b1 located in the first area c1 coincides with the start timing of the second video image b2 located in the second area c2, the first video image b1 can be synchronized with the second video image b2. Therefore, the quality of the video image displayed in the video image area e1 is improved.

When the start timing of the first video image b1 located in the first area c1 does not coincide with the start timing of the second video image b2 located in the second area c2, the processing of synchronizing the first video image b1 with the second video image b2 can be eliminated.

Meanwhile, when it is determined that a touch operation on the second object a2 is performed in a state where a touch operation on the first object a1 is not performed, the generation unit 42 in step S107 superimposes the second video image b2 on the second area c2 without superimposing the first video image b1 on the first area c1.

The position of the second area c2 in the background image c is not limited to the position shown in FIG. 7. For example, the position of the second area c2 in the background image c may be set in such a way that the centroid position of the second area c2 coincides with the centroid position of the background image c.

Next, when the user touches the second video image b2 with a finger and subsequently moves the finger in contact with the touch panel 1, the touch panel 1 outputs touch position information representing the trajectory of the touch position of the finger to the processing device 4. When the start position of the trajectory represented by the touch position information is the position where the second video image b2 is present, the display control unit 41 in step S108 determines that an operation to move the second video image b2 is performed.

When it is determined that an operation to move the second video image b2 is performed, the display control unit 41 in step S109 moves the position of the second video image b2, that is, the position of the second area c2, according to the trajectory represented by the touch position information.

The display control unit 41 may change the size of the second video image b2, that is, the size of the second area c2, according to an operation on the second video image b2. The display control unit 41 may also change the direction of the second video image b2, that is, the direction of the second area c2, according to an operation on the second video image b2.

Next, when the user touches the complete button e2 with a finger, the touch panel 1 outputs touch position information representing the touch position of the finger to the processing device 4. When the touch position represented by the touch position information is the position of the complete button e2, the generation unit 42 in step S110 determines that a completion operation is performed.

When it is determined that a completion operation is performed, the generation unit 42 in step S111 generates image data representing the video image shown in the video image area e1. For example, when the first superimposed video image d1 is shown in the video image area e1, the generation unit 42 generates the first image data representing the first superimposed video image d1. When the second superimposed video image d2 is shown in the video image area e1, the generation unit 42 generates the second image data representing the second superimposed video image d2. The generation unit 42 stores the image data generated in step S111 into the storage device 3.

Next, when the user touches the send button e3 with a finger, the touch panel 1 outputs touch position information representing the touch position of the finger to the processing device 4. When the touch position represented by the touch position information is the position of the send button e3, the operation control unit 43 is step S112 determines that a transmission instruction is given.

When it is determined that a transmission instruction is given, the operation control unit 43 in step S113 transmits image data to the projector 200. In step S113, the operation control unit 43 first reads image data from the storage device 3. For example, when the storage device 3 stores only one piece of image data, for example, only one piece of first image data or only one piece of second image data, the operation control unit 43 reads this image data from the storage device 3. When the storage device 3 stores a plurality of pieces of image data, the operation control unit 43 allows the user to select image data to be transmitted to the projector 200 from among the plurality of pieces of image data, and reads the selected image data from the storage device 3. Subsequently, the operation control unit 43 causes the communication device 2 to transmit the image data read from the storage device 3, to the projector 200.

On receiving the first image data, the projector 200 stores the first image data. Subsequently, the projector 200 repeatedly projects the video image represented by the first image data onto a projection target object such as a product. Meanwhile, on receiving the second image data, the projector 200 stores the second image data. Subsequently, the projector 200 repeatedly projects the video image represented by the second image data onto a projection target object. The projection target object is not limited to a product. For example, the projection target object may be an object that is not a product, for example, a projection surface such as a screen or wall.

When the touch position represented by the touch position information is not the position of the first object a1 in step S102 described above, the processing proceeds to step S104 instead of step S103.

When the start position of the trajectory represented by the touch position information is not the position where the first video image b1 is present in step S104 described above, the processing proceeds to step S106 instead of step S105.

When the touch position represented by the touch position information is not the position of the second object a2 in step S106 described above, the processing proceeds to step S108 instead of step S107.

When the start position of the trajectory represented by the touch position information is not the position where the second video image b2 is present in step S108 described above, the processing proceeds to step S110 instead of step S109.

When the touch position represented by the touch position information is not the position of the complete button e2 in step S110 described above, the processing proceeds to step S102 instead of step S111.

When the touch position represented by the touch position information is not the position of the send button e3 in step S112 described above, the processing proceeds to step S102 instead of step S113.

A4. Overview of First Embodiment

The method for generating image data, the program, and the information processing device 100 according to this embodiment include the configurations described below.

The display control unit 41 causes the first object a1 corresponding to the first video image b1 to be displayed on the display surface 1a. The generation unit 42 generates the first image data, based on the first operation on the first object a1. The first image data represents the first superimposed video image d1, in which the first video image b1 is superimposed on the first area c1 of the background image c. The time length of the first video image b1 is 15.0 seconds divided by m, m being an integer equal to or greater than 1. The time length of the first superimposed video image d1 is 15.0 seconds. The first superimposed video image d1 is a video image in which the display of the first video image b1 is executed m times in the state where the first video image b1 is superimposed on the first area c1 of the background image c.

According to this configuration, the user does not need to input an instruction about every movement to be executed by an object such as a character and therefore can save time and effort. The first image data representing the video image having the predetermined time length, specifically, the first image data representing the first superimposed video image d1 having the time length of 15.0 seconds, can be easily generated, based on a simple operation, that is, the operation on the first object a1. The time length of the first superimposed video image d1 is not limited to 15.0 seconds. In the first superimposed video image d1, the first video image b1 is displayed m times. Therefore, the first image of the first superimposed video image d1 can include the first image of the first video image b1, and the last image of the first superimposed video image d1 can include the last image of the first video image b1. In the first superimposed video image d1, the speed of the first video image b1 can be maintained. Therefore, the first video image b1 can be displayed in the form as intended by a creator of the first video image b1.

When the first image of the first video image b1 coincides with the last image of the first video image b1, the video image presented by repeatedly displaying the first video image b1 can be recognized as a seamless video image.

Therefore, when the first superimposed video image d1 is repeatedly displayed using the first image data, the video image presented by the repeatedly displayed first superimposed video image d1 can be recognized as a seamless video image.

The display control unit 41 also causes the second object a2 corresponding to the second video image b2 to be displayed on the display surface 1a. The generation unit 42 generates the second image data, based on the first operation on the first object a1 and the second operation on the second object a2. The second image data represents the second superimposed video image d2, in which the first video image b1 is superimposed on the first area c1 of the background image c and the second video image b2 is superimposed on the second area c2 of the background image c. The time length of the second video image b2 is 15.0 seconds divided by n, n being an integer equal to or greater than 1. The time length of the second superimposed video image d2 is 15.0 seconds. The second superimposed video image d2 is a video image in which the display of the first video image b1 is executed m times and the display of the second video image b2 is executed n times in the state where the first video image b1 is superimposed on the first area c1 of the background image c and the second video image b2 is superimposed on the second area c2 of the background image c.

According to this configuration, the second image data representing the video image having the predetermined time length, specifically, the second image data representing the second superimposed video image d2 having the time length of 15.0 seconds, can be easily generated, based on a simple operation, that is, the operation on the first object a1 and the operation on the second object a2. The time length of the second superimposed video image d2 is not limited to 15.0 seconds.

In the second superimposed video image d2, the display of the first video image b1 is executed m times and the display of the second video image b2 is executed n times.

Therefore, the first image of the second superimposed video image d2 can include the first image of the first video image b1 and the first image of the second video image b2, and the last image of the second superimposed video image d2 can include the last image of the first video image b1 and the last image of the second video image b2.

In the second superimposed video image d2, the speed of the second video image b2 can be maintained. Therefore, the second video image b2 can be displayed in the form as intended by the creator of the second video image b2.

When the first image of the second video image b2 coincides with the last image of the second video image b2, the video image presented by repeatedly displaying the second video image b2 can be recognized as a seamless video image.

Therefore, when the second superimposed video image d2 is repeatedly displayed using the second image data, the video image presented by the repeatedly displayed second superimposed video image d2 can be recognized as a seamless video image.

B. Modification Examples

Modified configurations of the foregoing embodiment will now be described. Two or more configurations arbitrarily selected from the examples described below may be suitably combined together without contracting each other.

B1. First Modification Example

In the first embodiment, each of the time length of the first video image b1 included in the first superimposed video image d1, the time length of the first video image b1 included in the second superimposed video image d2, and the time length of the second video image b2 included in the second superimposed video image d2 is not changed.

In a first modification example, each of the time length of the first video image b1 included in the first superimposed video image d1, the time length of the first video image b1 included in the second superimposed video image d2, and the time length of the second video image b2 included in the second superimposed video image d2 can be changed.

Specifically, when a value obtained by dividing a first time that is set as the time length of the first superimposed video image d1 by a second time that is set as the time length of the first video image b1 is not an integer, the generation unit 42 changes the time length of the first video image b1 included in the first superimposed video image d1 from the second time to a third time that is different from the second time.

For example, the third time is the first time divided by p, p being an integer equal to or greater than 1. p is an integer having the smallest difference from the first time divided by the second time, of integers equal to and greater than 1. In this case, the first superimposed video image d1 is a video image in which the display of the first video image b1 is executed p times in the state where the first video image b1 is superimposed on the first area c1 of the background image c.

In an example, when the first time is 15.0 seconds and the second time is 12.0 seconds, the integer having the smallest difference from "1.25", that is, the first time of 15.0 seconds divided by the second time of 12.0 seconds, of integers equal to and greater than 1, is "1".

Therefore, the generation unit 42 decides the value of p as "1". The generation unit 42 then decides the third time as 15.0 seconds, that is, the first time of 15.0 seconds divided by p of "1". In this case, the first superimposed video image d1 is a video image in which the display of the first video image b1 is executed once in the state where the first video image b1 is superimposed on the first area c1 of the background image c.

The generation unit 42 adjusts the speed of the first video image b1 in order to change the time length of the first video image b1 from 12.0 seconds to 15.0 seconds.

When the first time is 15.00 seconds and the second time is 4.00 seconds, the integer having the smallest difference from "3.75", that is, the first time of 15.00 seconds divided by the second time of 4.00 seconds, of integers equal to or greater than 1, is "4".

Therefore, the generation unit 42 decides the value of p as "4". The generation unit 42 then decides the third time as 3.75 seconds, that is, the first time of 15.00 seconds divided by p of "4". In this case, the first superimposed video image d1 is a video image in which the display of the first video image b1 is executed four times in the state where the first video image b1 is superimposed on the first area c1 of the background image c.

The generation unit 42 adjusts the speed of the first video image b1 in order to change the time length of the first video image b1 from 4.00 seconds to 3.75 seconds.

When there are two integers having the smallest difference from the first time divided by the second time, of integers equal to and greater than 1, the generation unit 42 may decides the value of p as the larger one or the smaller one of the two integers.

The generation unit 42 can also modify the second superimposed video image d2 similarly to the first superimposed video image d1.

According to this configuration, even when the time length of the first superimposed video image d1 is not an integral multiple of the time length of the first video image b1, the first image of the first superimposed video image d1 can include the first image of the first video image b1, and the last image of the first superimposed video image d1 can include the last image of the first video image b1.

Also, even when the time length of the second superimposed video image d2 is not an integral multiple of the time length of the first video image b1, the first image of the second superimposed video image d2 can include the first image of the first video image b1, and the last image of the second superimposed video image d2 can include the last image of the first video image b1.

Moreover, even when the time length of the second superimposed video image d2 is not an integral multiple of the time length of the second video image b2, the first image of the second superimposed video image d2 can include the first image of the second video image b2, and the last image of the second superimposed video image d2 can include the last image of the second video image b2.

Thus, when the first image of the first video image b1 coincides with the last image of the first video image b1, when the first superimposed video image d1 is repeatedly displayed, the video image presented by the repeatedly displayed first superimposed video image d1 can be recognized as a seamless video image.

In the case where the first image of the first video image b1 coincides with the last image of the first video image b1 and the first image of the second video image b2 coincides with the last image of the second video image b2, when the second superimposed video image d2 is repeatedly displayed, the video image presented by the repeatedly displayed second superimposed video image d2 can be recognized as a seamless video image.

Each of the first video image b1 and the second video image b2 is an example of a predetermined video image.

Each of the first object a1 and the second object a2 is an example of an object. Each of the first superimposed video image d1 and the second superimposed video image d2 is an example of a superimposed video image. Each of the first image data and the second image data is an example of image data.

B2. Second Modification Example

In the first embodiment and the first modification example, the positional relationship between the video image area e1, the complete button e2, the send button e3, the first object a1, and the second object a2 is not limited the positional relationship shown in FIG. 1. Each of the first object a1 and the second object a2 may be displayed on a different screen from the screen where the video image area e1 is displayed.

B3. Third Modification Example

In the first embodiment and the first and second modification examples, the number of objects corresponding to a video image is not limited to two and may be one, or three or more.

B4. Fourth Modification Example

In the first embodiment and the first to third modification examples, a video image corresponding to an object may show a process in which the amount of an object increases or decreases. For example, a video image corresponding to an object may show a process in which there is no snow in an initial state, subsequently snow begins to fall and pile up, and then the piled-up snow is blown by the wind, thus returning to the state where there is no snow. The object is not limited to snow. For example, the object may be water, a leaf of a tree, or a living thing.

B5. Fifth Modification Example

In the first embodiment and the first to fourth modification examples, the generation unit 42 may change the content of the first video image b1 arranged in the video image area e1, based on an operation to change the content of the first video image b1 arranged in the video image area e1.

For example, when the user keeps touching the first video image b1 arranged in the video image area e1 for a threshold time, the generation unit 42 changes the direction of rotation of the Christmas tree b11 into the direction opposite to the direction indicated by the first arrow b12. The change in the content of the first video image b1 is not limited to the change in the direction of rotation. The threshold time is, for example, 3 seconds. The threshold time is not limited to 3 seconds and can be suitably changed.

Even when the content of the first video image b1 arranged in the video image area e1 is changed, it is desirable that the first image of the first video image b1 coincides with the last image of the first video image b1.

In this case, even when the content of the first video image b1 arranged in the video image area e1 is changed, the video presented by repeatedly displaying the first superimposed video image d1 can be recognized as a seamless video.

Also, in the first embodiment and the first to fourth modification examples, the generation unit 42 may change the content of the second video image b2 arranged in the video image area e1, based on an operation to change the content of the second video image b2 arranged in the video image area e1.

For example, when the user keeps touching the second video image b2 arranged in the video image area e1 for a threshold time, the generation unit 42 changes the color of the present box b21. The change in the content of the second video image b2 is not limited to the change in the color of the present box b21.

Even when the content of the second video image b2 arranged in the video image area e1 is changed, it is desirable that the first image of the second video image b2 coincides with the last image of the second video image b2.

In this case, in the state where the first image of the first video image b1 coincides with the last image of the first video image b1, even when the content of the second video image b2 arranged in the video image area e1 is changed, the video presented by repeatedly displaying the second superimposed video image d2 can be recognized as a seamless video.

B6. Sixth Modification Example

In the first embodiment and the first to fifth modification examples, the display control unit 41 and the generation unit 42 may be provided in a server communicating with a terminal device, instead of in a terminal device such as a smartphone. In this case, the server causes the operation screen e to be displayed on the display surface of the terminal device, generates the first image data and the second image data, based on an operation on the operation screen e, and provides the first image data and the second image data to the information processing device 100 such as a smartphone. In this case, the server functions as an information processing device.

What is claimed is:

1. A method for generating image data, the method comprising:
   displaying a first object corresponding to a first video image on a display surface;
   displaying a second object corresponding to a second video image on the display surface; and
   generating an image data representing a superimposed video image in which the first video image is superimposed on a first area of a predetermined image and the second video image is superimposed on a second area of the predetermined image, based on a first operation on the first object and a second operation on the second object, wherein
   the first video image has a time length that is a predetermined time divided by m, m being an integer equal to or greater than 1,
   the second video image has a time length that is the predetermined time divided by n, n being an integer equal to or greater than 1,
   the superimposed video image has a time length that is the predetermined time,
   the superimposed video image is a video image in which display of the first video image is executed the m times and display of the second video image is executed the n times, and
   m and n are different integers.

2. The method for generating image data according to claim 1, wherein
   a first image of the first video image coincides with a last image of the first video image.

3. The method for generating image data according to claim 1, wherein
a first image of the second video image coincides with a last image of the second video image.

4. An information processing device comprising:
a display control unit causing a first object corresponding to a first video image to be displayed on a display surface and a second object corresponding to a second video image to be displayed on the display surface; and
a generation unit generating an image data representing a superimposed video image in which the first video image is superimposed on a first area of a predetermined image and the second video image is superimposed on a second area of the predetermined image, based on a first operation on the first object and a second operation on the second object, wherein
the first video image has a time length that is a predetermined time divided by m, m being an integer equal to or greater than 1,
the second video image has a time length that is the predetermined time divided by n, n being an integer equal to or greater than 1,
the superimposed video image has a time length that is the predetermined time,
the superimposed video image is a video image in which display of the first video image is executed the m times and display of the second video image is executed the n times, and
m and n are different integers.

* * * * *